(12) United States Patent
Zheng et al.

(10) Patent No.: US 12,413,991 B2
(45) Date of Patent: Sep. 9, 2025

(54) CELL MEASUREMENT METHOD AND DEVICE

(71) Applicant: HUAWEI TECHNOLOGIES CO., LTD., Guangdong (CN)

(72) Inventors: Lili Zheng, Shanghai (CN); Hongping Zhang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 483 days.

(21) Appl. No.: 17/390,890

(22) Filed: Jul. 31, 2021

(65) Prior Publication Data

US 2021/0360464 A1    Nov. 18, 2021

Related U.S. Application Data

(63) Continuation of application No. PCT/CN2020/072316, filed on Jan. 15, 2020.

(30) Foreign Application Priority Data

Feb. 2, 2019    (CN) .......................... 201910106362.1

(51) Int. Cl.
*H04W 24/10*      (2009.01)
*H04W 52/02*      (2009.01)
*H04W 56/00*      (2009.01)

(52) U.S. Cl.
CPC ....... *H04W 24/10* (2013.01); *H04W 52/0209* (2013.01); *H04W 56/001* (2013.01)

(58) Field of Classification Search
CPC ..... H04L 5/006; H04L 5/0091; H04L 5/0053; Y02D 30/70; H04W 24/10; H04W 52/0209
See application file for complete search history.

(56) References Cited

U.S. PATENT DOCUMENTS 5,428,816 A * 6/1995 Barnett .......... H04W 36/00835
455/437

FOREIGN PATENT DOCUMENTS

| CN | 102158893 A | 8/2011 |
|---|---|---|
| CN | 102378242 A | 3/2012 |
| CN | 103037403 A | 4/2013 |

(Continued)

OTHER PUBLICATIONS

VIVO: Summary of UE power ConsumptionReduction in RRM Measurements 3GPP Draft; R1-1811914,Oct. 10, 2018 (Oct. 10, 2018), XP051519238 , total 10 pages.

(Continued)

*Primary Examiner* — Zhensheng Zhang
(74) *Attorney, Agent, or Firm* — WOMBLE BOND DICKINSON (US) LLP (57) ABSTRACT

A cell measurement method and an apparatus are provided, to resolve a problem in the conventional technology that a resource waste is caused due to excessively high power consumption of a terminal device. In the method, after determining indication information, a network device sends the indication information to the terminal device, where the indication information indicates the terminal device to perform cell measurement to obtain N cells meeting a cell quality parameter threshold; and the terminal device performs cell measurement based on the indication information.

10 Claims, 5 Drawing Sheets

(56) References Cited

FOREIGN PATENT DOCUMENTS

| | | | |
|---|---|---|---|
| CN | 103052087 A | 4/2013 | |
| CN | 103858463 A | 6/2014 | |
| CN | 106102085 A | 11/2016 | |
| EP | 2584819 A1 | 4/2013 | |
| EP | 2725846 A1 * | 4/2014 | ............ H04W 24/04 |
| WO | 2012023161 A1 | 2/2012 | |
| WO | 2018143240 A1 | 8/2018 | |

OTHER PUBLICATIONS

NTT DOCOMO et al.: "Discussion on UE powerConsumption Reduction in RRMMeasurements" 3GPP Draft; R1-1900982,Jan. 20, 2019,XP051593827, total 4 pages.

3GPP TS 38.215 V15.4.0 (Dec. 2018), 3rd Generation Partnership Project; Technical Specification Group Radio Access Network; NR; Physical layer measurements(Release 15), 15 pages.

3GPP TS 38.133 V15.4.0 (Dec. 2018), 3rd Generation Partnership Project; Technical Specification Group Radio Access Network; NR; Requirements for support of radio resource management(Release 15), 876 pages.

3GPP TS 38.331 V15.4.0 (Dec. 2018), 3rd Generation Partnership Project; Technical Specification Group Radio Access Network; NR; Radio Resource Control (RRC) protocol specification(Release 15), 474 pages.

3GPP TS 38.300 V15.4.0 (Dec. 2018), 3rd Generation Partnership Project; Technical Specification Group Radio Access Network; NR; NR and NG-RAN Overall Description; Stage 2(Release 15), 97 pages.

3GPP TS 38.306 V15.4.0 (Dec. 2018), 3rd Generation Partnership Project; Technical Specification Group Radio Access Network; NR; User Equipment (UE) radio access capabilities(Release 15), 40 pages.

* cited by examiner

CELL MEASUREMENT METHOD AND DEVICE

CROSS-REFERENCE TO RELATED APPLICATIONS

This application is a continuation of International Application No. PCT/CN2020/072316, filed on Jan. 15, 2020, which claims priority to Chinese Patent Application No. 201910106362.1, filed on Feb. 2, 2019. The disclosures of the aforementioned applications are hereby incorporated by reference in their entireties.

TECHNICAL FIELD

This application relates to the communications field, and in particular, to a cell measurement method and an apparatus.

BACKGROUND

Mobility management is an important part in wireless mobile communication. Mobility management is related content for ensuring that a communication link between a network and a terminal device is not interrupted due to movement of the terminal device. Based on states of the terminal device, mobility management may be roughly classified into two parts: mobility management in an idle state (RRC_IDLE state) and mobility management in a connected state (RRC_CONNECTED state). In the idle state, mobility management mainly refers to a cell selection/reselection (cell selection/reselection) process. In the connected state, mobility management mainly refers to cell handover. Both cell selection/reselection and handover are performed based on a mobility measurement result. Therefore, mobility measurement is the basis of mobility management.

In a mobility measurement process, the terminal device measures a cell based on measurement configuration information sent by a network device, and reports a measurement report to the network device. The most common mobility measurement is synchronization signal/physical broadcast channel block (synchronization signal (SS))/physical broadcast channel (PBCH)) block (SSB))-based measurement and channel state information-reference signal (CSI-RS)-based measurement by the terminal device.

Currently, when the terminal device performs SSB-based measurement, all cells on a to-be-measured frequency of an SSB need to be measured. Because a reference signal corresponding to the SSB is scrambled by using a physical cell identifier (PCI), the terminal device needs to use all PCIs on a frequency of one SSB to examine to-be-measured cells. As a result, power consumption of the terminal device is excessively high, causing a resource waste.

SUMMARY

This application provides a cell measurement method and an apparatus, to resolve a problem in the conventional technology that a resource waste is caused due to excessively high power consumption of a terminal device.

According to a first aspect, this application provides a cell measurement method. The method may include: After receiving indication information from a network device, a terminal device performs cell measurement based on the indication information. The indication information indicates the terminal device to perform cell measurement to obtain N cells meeting a cell quality parameter threshold, where N is an integer greater than or equal to 1.

According to the foregoing method, the terminal device does not need to measure all the cells in real time, and may measure only the N cells in a targeted manner, to reduce a quantity of to-be-measured cells, thereby reducing power of the terminal device to avoid a resource waste.

In one embodiment, when M cells in the N cells do not meet the cell quality parameter threshold, the terminal device measures cells other than the N cells, to obtain M cells meeting the cell quality parameter threshold, where M is an integer greater than or equal to 1.

According to the foregoing method, the terminal device can accurately obtain the N cells meeting the cell quality parameter threshold.

In one embodiment, when M cells in the N cells do not meet the cell quality parameter threshold, the terminal device measures all neighboring cells on a frequency of a current synchronization signal/physical broadcast channel block (SSB), to obtain N cells with best cell quality parameters and meeting the cell quality parameter threshold, where M is an integer greater than or equal to 1.

According to the foregoing method, the terminal device can accurately obtain the N cells meeting the cell quality parameter threshold.

In one embodiment, the indication information indicates that N is a maximum quantity of reported neighboring cells (maxReportCells). In this way, existing maxReportCells may be reused to indicate the quantity of to-be-measured cells.

According to a second aspect, this application provides a cell measurement method. The method includes: After determining indication information, a network device sends the indication information to a terminal device, where the indication information indicates the terminal device to perform cell measurement to obtain N cells meeting a cell quality parameter threshold, and N is an integer greater than or equal to 1.

According to the foregoing method, the terminal device does not need to measure all the cells in real time, and may measure only the N cells in a targeted manner, to reduce a quantity of to-be-measured cells, thereby reducing power of the terminal device to avoid a resource waste.

In one embodiment, the indication information indicates that N is a maximum quantity of reported neighboring cells (maxReportCells). In this way, existing maxReportCells may be reused to indicate the quantity of to-be-measured cells.

According to a third aspect, this application provides a cell measurement method. The method includes: After receiving indication information from a network device, a terminal device performs cell measurement based on the indication information, where the indication information is used to indicate the terminal device to measure a part of neighboring cells.

According to the foregoing method, the terminal device does not need to measure all the cells in real time, and may measure only the N cells in a targeted manner, to reduce a quantity of to-be-measured cells, thereby reducing power of the terminal device to avoid a resource waste.

In one embodiment, the indication information includes physical cell identifier (PCI) information, and the PCI information indicates a part of PCIs in an available PCI set. In this way, the part of neighboring cells can be indicated by using the PCI information, so that the terminal device subsequently performs cell measurement on the part of neighboring cells.

In one embodiment, the indication information further includes a first measurement indication, and the first measurement indication is used to indicate the terminal device to perform cell measurement based on a PCI corresponding to the PCI information. In this way, the terminal device can perform cell measurement on the part of neighboring cells.

In one embodiment, the PCI information is a PCI list; the PCI information includes a start PCI and an end PCI; the PCI information includes a start PCI and a quantity of PCIs; or the PCI information includes an end PCI and a quantity of PCIs. In this way, the PCI information can be flexibly obtained, so that the terminal device performs measurement based on the PCI.

In one embodiment, the indication information includes a second measurement indication, and the second measurement indication is used to indicate the terminal device to measure a neighboring cell indicated in a measurement object MO. In this way, the part of neighboring cells can be measured based on the neighboring cell indicated in the MO.

In one embodiment, that the terminal device performs cell measurement based on the indication information may include: The terminal device removes a neighboring cell corresponding to a PCI indicated by a cell removal list in the MO from a list of to-be-measured neighboring cells that is stored in the terminal device; and adds, to the list of to-be-measured neighboring cells that is stored in the terminal device, a neighboring cell corresponding to a PCI indicated by a cell addition or modification list in the MO; and the terminal device performs cell measurement based on the list of to-be-measured neighboring cells that is stored in the terminal device.

According to the foregoing method, the part of neighboring cells can be measured, to reduce a quantity of to-be-measured cells, thereby reducing power of the terminal device to avoid a resource waste.

According to a fourth aspect, this application provides a cell measurement method. The method may include: After determining indication information, a network device sends the indication information to a terminal device, where the indication information is used to indicate the terminal device to measure a part of neighboring cells.

According to the foregoing method, the terminal device does not need to measure all the cells in real time, and may measure only the N cells in a targeted manner, to reduce a quantity of to-be-measured cells, thereby reducing power of the terminal device to avoid a resource waste.

In one embodiment, the indication information includes physical cell identifier PCI information, and the PCI information indicates a part of PCIs in an available PCI set. In this way, the part of neighboring cells can be indicated by using the PCI information, so that the terminal device subsequently performs cell measurement on the part of neighboring cells.

In one embodiment, the indication information further includes a first measurement indication, and the first measurement indication is used to indicate the terminal device to perform cell measurement based on a PCI corresponding to the PCI information. In this way, the terminal device can perform cell measurement on the part of neighboring cells.

In one embodiment, the PCI information is a PCI list; the PCI information includes a start PCI and an end PCI; the PCI information includes a start PCI and a quantity of PCIs; or the PCI information includes an end PCI and a quantity of PCIs. In this way, the PCI information can be flexibly obtained, so that the terminal device performs measurement based on the PCI.

In one embodiment, the indication information includes a second measurement indication, and the second measurement indication is used to indicate the terminal device to measure a neighboring cell indicated in a measurement object (MO). In this way, the part of neighboring cells can be measured based on the neighboring cell indicated in the MO.

According to a fifth aspect, this application provides a terminal device. The terminal device has a function of implementing the terminal device in the method in the first aspect. The function may be implemented by hardware, or may be implemented by hardware executing corresponding software. The hardware or software includes one or more modules corresponding to the function.

In one embodiment, a structure of the terminal device includes a transceiver unit and a processing unit. These units may perform corresponding functions in the method in the first aspect. For details, refer to the detailed description in the method. Details are not described herein again.

In one embodiment, a structure of the terminal device includes a transceiver and a processor, and In one embodiment may further include a memory. The transceiver is configured to send and receive data, and perform communication and interaction with another device in a communications system. The processor is configured to support the terminal device in performing a corresponding function in the method in the first aspect. The memory is coupled to the processor, and stores program instructions and data that are necessary for the terminal device. The details are as follows.

The transceiver is configured to receive indication information from a network device, where the indication information indicates the terminal device to perform cell measurement to obtain N cells meeting a cell quality parameter threshold, and N is an integer greater than or equal to 1; and the processor is configured to perform cell measurement based on the indication information.

In one embodiment, when M cells in the N cells do not meet the cell quality parameter threshold, the processor is further configured to measure cells other than the N cells, to obtain M cells meeting the cell quality parameter threshold, where M is an integer greater than or equal to 1.

In one embodiment, when M cells in the N cells do not meet the cell quality parameter threshold, the processor is further configured to: measure all neighboring cells on a frequency of a current synchronization signal/physical broadcast channel block (SSB), to obtain N cells with best cell quality parameters and meeting the cell quality parameter threshold, where M is an integer greater than or equal to 1.

In one embodiment, the indication information indicates that N is a maximum quantity of reported neighboring cells maxReportCells.

According to a sixth aspect, this application provides a network device. The network device has a function of implementing the network device in the method in the second aspect. The function may be implemented by hardware, or may be implemented by hardware executing corresponding software. The hardware or software includes one or more modules corresponding to the function.

In one embodiment, a structure of the network device includes a processing unit and a transceiver unit. These units may perform corresponding functions in the method in the second aspect. For details, refer to the detailed description in the method. Details are not described herein again.

In one embodiment, a structure of the network device includes a transceiver and a processor, and In one embodiment may further include a memory. The transceiver is configured to send and receive data, and perform communication and interaction with another device in a communications system. The processor is configured to support the network device in performing a corresponding function in the method in the second aspect. The memory is coupled to the processor, and stores program instructions and data that are necessary for the network device. The details are as follows.

The processor is configured to determine indication information, where the indication information indicates a terminal device to perform cell measurement to obtain N cells meeting a cell quality parameter threshold, and N is an integer greater than or equal to 1; and the transceiver is configured to send the indication information to the terminal device.

In one embodiment, the indication information indicates that N is a maximum quantity of reported neighboring cells maxReportCells.

According to a seventh aspect, this application provides a terminal device. The terminal device has a function of implementing the terminal device in the method in the third aspect. The function may be implemented by hardware, or may be implemented by hardware executing corresponding software. The hardware or software includes one or more modules corresponding to the function.

In one embodiment, a structure of the terminal device includes a transceiver unit and a processing unit. These units may perform corresponding functions in the method in the third aspect. For details, refer to the detailed description in the method. Details are not described herein again.

In one embodiment, a structure of the terminal device includes a transceiver and a processor, and In one embodiment may further include a memory. The transceiver is configured to send and receive data, and perform communication and interaction with another device in a communications system. The processor is configured to support the terminal device in performing a corresponding function in the method in the third aspect. The memory is coupled to the processor, and stores program instructions and data that are necessary for the terminal device. The details are as follows.

The transceiver is configured to receive indication information from a network device, where the indication information is used to indicate the terminal device to measure a part of neighboring cells; and the processor is configured to perform cell measurement based on the indication information.

In one embodiment, the indication information includes physical cell identifier PCI information, and the PCI information indicates a part of PCIs in an available PCI set.

In one embodiment, the indication information further includes a first measurement indication, and the first measurement indication is used to indicate the terminal device to perform cell measurement based on a PCI corresponding to the PCI information.

In one embodiment, the PCI information is a PCI list; the PCI information includes a start PCI and an end PCI; the PCI information includes a start PCI and a quantity of PCIs; or the PCI information includes an end PCI and a quantity of PCIs.

In one embodiment, the indication information includes a second measurement indication, and the second measurement indication is used to indicate the terminal device to measure a neighboring cell indicated in a measurement object MO.

In one embodiment, when performing cell measurement based on the indication information, the processor is specifically configured to: remove a neighboring cell corresponding to a PCI indicated by a cell removal list in the MO from a list of to-be-measured neighboring cells that is stored in the terminal device; and add, to the list of to-be-measured neighboring cells that is stored in the terminal device, a neighboring cell corresponding to a PCI indicated by a cell addition or modification list in the MO; and perform cell measurement based on the list of to-be-measured neighboring cells that is stored in the terminal device.

According to an eighth aspect, this application provides a network device. The network device has a function of implementing the network device in the method in the fourth aspect. The function may be implemented by hardware, or may be implemented by hardware executing corresponding software. The hardware or software includes one or more modules corresponding to the function.

In one embodiment, a structure of the network device includes a processing unit and a transceiver unit. These units may perform corresponding functions in the method in the fourth aspect. For details, refer to the detailed description in the method. Details are not described herein again.

In one embodiment, a structure of the network device includes a transceiver and a processor, and In one embodiment may further include a memory. The transceiver is configured to send and receive data, and perform communication and interaction with another device in a communications system. The processor is configured to support the network device in performing a corresponding function in the method in the fourth aspect. The memory is coupled to the processor, and stores program instructions and data that are necessary for the network device. The details are as follows.

The processor is configured to determine indication information, where the indication information is used to indicate a terminal device to measure a part of neighboring cells; and the transceiver is configured to send the indication information to the terminal device.

In one embodiment, the indication information includes physical cell identifier PCI information, and the PCI information indicates a part of PCIs in an available PCI set.

In one embodiment, the indication information further includes a first measurement indication, and the first measurement indication is used to indicate the terminal device to perform cell measurement based on a PCI corresponding to the PCI information.

In one embodiment, the PCI information is a PCI list; the PCI information includes a start PCI and an end PCI; the PCI information includes a start PCI and a quantity of PCIs; or the PCI information includes an end PCI and a quantity of PCIs.

In one embodiment, the indication information includes a second measurement indication, and the second measurement indication is used to indicate the terminal device to measure a neighboring cell indicated in a measurement object MO.

According to a ninth aspect, this application further provides a communications system. The communications system may include the terminal device, the network device, and the like mentioned in the foregoing design.

According to a tenth aspect, this application further provides a computer storage medium, where the computer storage medium stores computer-executable instructions, and when the computer-executable instructions are invoked by a computer, the computer is enabled to perform any one of the foregoing methods.

According to an eleventh aspect, this application further provides a computer program product including instructions, When the computer program product runs on a computer, the computer is enabled to perform any one of the foregoing methods.

According to a twelfth aspect, this application further provides a chip. The chip is coupled to a memory, and is configured to read and execute program instructions stored in the memory, to implement any one of the foregoing methods.

DESCRIPTION OF EMBODIMENTS

The following further describes in detail this application with reference to the accompanying drawings.

Embodiments of this application provide a cell measurement method and an apparatus, to resolve a problem in the conventional technology that a resource waste is caused due to excessively high power consumption of a terminal device. The method and the apparatus described in this application are based on a same inventive concept. Because problem resolving principles of the method and the apparatus are similar, mutual reference may be made to implementations of the apparatus and the method. Repeated parts are not described again.

In the description of this application, terms such as "first" and "second" are used only for purposes of distinguishing descriptions, but cannot be understood as indicating or implying relative importance, or as indicating or implying a sequence.

It is well known that mobility management is an important part in a wireless communications system. Based on states of the terminal device, mobility management may be roughly classified into two parts: mobility management in an idle state (RRC_IDLE state) and mobility management in a connected state (RRC_CONNECTED state). In the idle state, mobility management mainly refers to a cell selection/reselection process. Both cell selection/reselection and handover are performed based on a mobility measurement result. Therefore, mobility measurement is the basis of mobility management.

Specifically, a mobility measurement process may include the following operations:

Operation 1: A network device sends measurement configuration information (measConfig) to a terminal device.

Operation 2: The terminal device performs cell measurement based on the measurement configuration information, and reports a measurement result to the network device.

The measurement configuration information may include a measurement object (MO), a reporting configuration (reportConfig), a measurement identity (measId), a measurement quantity configuration, a measurement gap configuration, and the like.

The following describes some information in the measurement configuration information:

Measurement object (MO): In an LTE system, one MO corresponds to one frequency, and measurement parameters of the measurement object include a configuration of a measurement resource on the frequency, for example, a cell list on the frequency. In a new radio controller (NR) system, for intra-frequency measurement and inter-frequency measurement, the measurement object indicates a frequency-domain/time-domain position of a to-be-measured reference signal and a subcarrier spacing. For inter-RAT E-UTRA measurement, the measurement object corresponds to one E-UTRA frequency. Measurement parameters of one MO may include a measurement parameter corresponding to an SSB, and may further include a measurement parameter corresponding to a CSI-RS.

Reporting configuration: Measurement parameters of the reporting configuration include a type of a reference signal, a reporting type, a reporting format, and the like. The reporting type includes event-triggered reporting, periodic triggering reporting, or cell global identifier (CGI) reporting. If the reporting type is event-triggered reporting, the measurement parameters further include an event type, a threshold, duration that meets a trigger condition (time to trigger), and the like. Currently, the event type in the LTE system includes event A1 in which a triggering quantity of serving cells is higher than the threshold; event A2 in which a triggering quantity of serving cells is lower than the threshold; event A3 in which a triggering quantity of neighboring cells is better than a triggering quantity of primary cells (PCells)/primary secondary cell (PSCells) after an offset value is taken into consideration; event A4 in which a triggering quantity of neighboring cells is higher than the threshold; event A5 in which a triggering quantity of serving cells is lower than a first threshold, and a triggering quantity of neighboring cells is higher than a second threshold; and event A6 in which a triggering quantity of neighboring cells is better than a triggering quantity of secondary cells (SCells) after an offset value is taken into consideration. If the reporting manner is periodic triggering reporting, the measurement parameters further include a reporting periodicity, a periodic triggering purpose, and the like.

Figure 1:
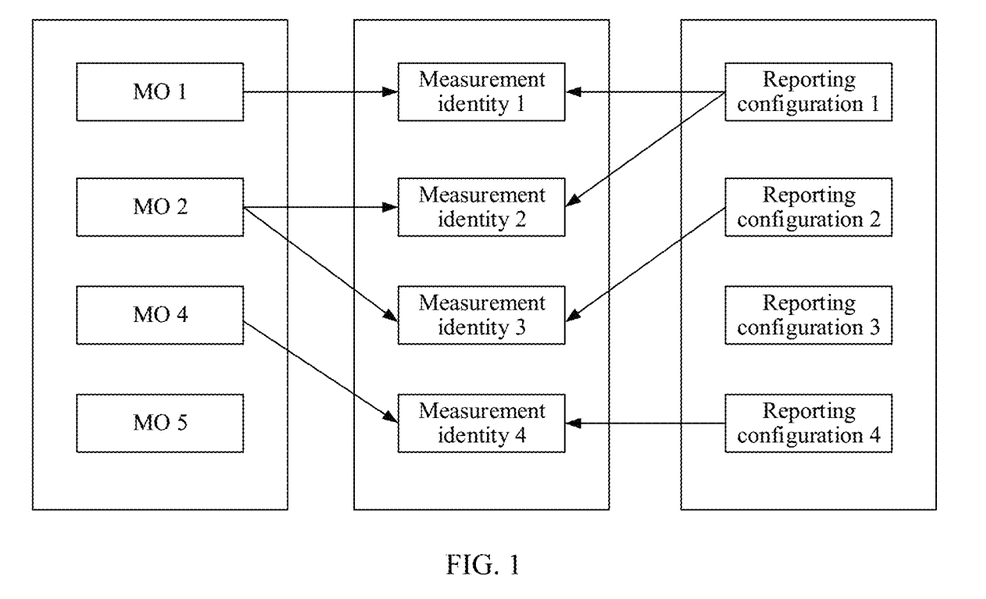
FIG. 1 is a schematic diagram of relationships between measurement identities, measurement objects, and reporting configurations.

Measurement identity: One measurement identity is a combination of one measurement object and one reporting configuration. The combination determines various details of measurement for one measurement object. For example, FIG. 1 is a schematic diagram of relationships between measurement identities, measurement objects (MOs), and reporting configurations.

Measurement quantity configuration: Before reporting the measurement result, the terminal device first performs layer 3 filtering on the triggering quantity. The measurement quantity configuration refers to a configuration of a layer 3 filtering coefficient.

Measurement gap configuration: If measurement and data transmission cannot be performed at the same time, a network needs to configure a measurement gap for the terminal device.

Currently, when the terminal device performs cell measurement, all cells need to be measured. However, when the terminal device performs SSB-based measurement, because a reference signal corresponding to an SSB is scrambled by using a physical cell identifier (PCI), the terminal device needs to use all PCIs on a frequency of one SSB to examine to-be-measured cells. As a result, power consumption of the terminal device is excessively high, causing a resource waste. Based on this, the embodiments of this application provide a cell measurement method, to resolve a problem of a resource waste caused by power consumption of the terminal device.

To describe the technical solutions in the embodiments of this application more clearly, the following describes in detail a cell measurement method and an apparatus provided in the embodiments of this application with reference to the accompanying drawings.

Figure 2:
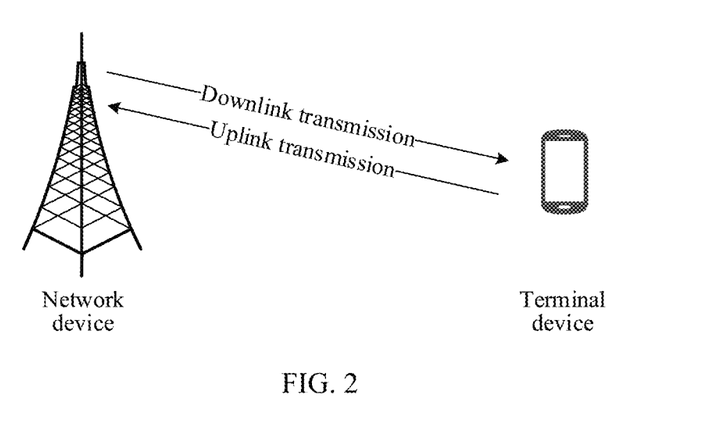
FIG. 2 is a schematic architectural diagram of a communications system according to this application.

FIG. 2 shows an architecture of a possible communications system to which the cell measurement method according to the embodiments of this application is applicable. The architecture of the communications system may include a terminal device and a network device.

The network device may be a radio access device. The radio access device may be a common base station (for example, a NodeB (NB) or an evolved NodeB (eNB)), may be a radio network controller (RNC), a base station controller (BSC), a base transceiver station (BTS), and a home base station (for example, a home evolved NodeB, or a home NodeB, HNB), a baseband unit (base band unit, BBU), or a wireless fidelity (Wifi) access point (AP), may be a new radio controller (NR controller), may be a gNodeB (gNB) in a 5G system, may be a centralized unit, may be a new radio base station, may be a remote radio module, may be a micro base station, or may be a relay, may be a distributed unit, may be a transmission reception point (TRP), a transmission point (TP), or any other radio access device. However, the embodiments of this application are not limited thereto, and examples are not listed herein one by one.

The terminal device may also be referred to as user equipment (UE), a mobile station (MS), a mobile terminal (MT), or the like, and is a device that provides voice and/or data connectivity for a user. For example, the terminal device may include a handheld device having a wireless connection function, a vehicle-mounted device, a computing device, a mobile station (MS), another processing device connected to a wireless modem, a mobile terminal that communicates with one or more core networks via an access network, or the like. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid (smart grid), a wireless terminal in transportation safety, a wireless terminal in a smart city, a wireless terminal in a smart home, or the like.

It should be noted that the architecture of the communications system shown in FIG. 2 is not limited to including only the devices shown in the figure, and may further include other devices not shown in the figure. Details are not listed one by one in this application.

It should be noted that the communications system shown in FIG. 2 does not constitute a limitation on a communications system to which the embodiments of this application are applicable. The communications system may be various communications systems, for example, may be long term evolution (LTE), may be a fifth generation (5G) communications system, or may be universal terrestrial radio access (UTRA), evolved UTRA (E-UTRAN), new radio (NR), GSM/EDGE radio access network-circuit switched (GERAN-CS), GSM/EDGE radio access network-packet switched (GERAN-PS), code division multiple access (CDMA) 2000-1×RTT, multi-RAT dual-connectivity (MR-DC), or the like, or may be a hybrid architecture of a plurality of communications systems, such as an LTE and 5G hybrid architecture. Certainly, the method in the embodiments of this application is further applicable to various future communications systems, for example, 6G or other communications networks.

Figure 3:
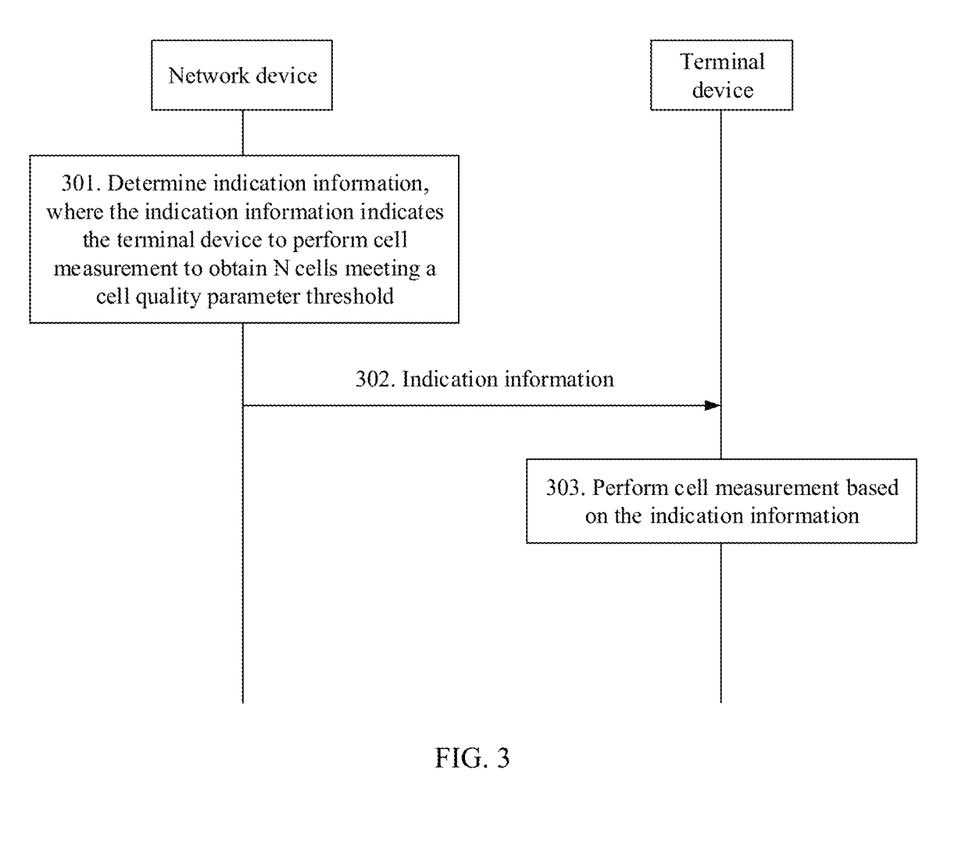
FIG. 3 is a flowchart of a cell measurement method according to this application.

An embodiment of this application provides a cell measurement method applicable to the communications system shown in FIG. 2. Referring to FIG. 3, a specific procedure of the method may include the following operations:

Operation 301: A network device determines indication information, where the indication information indicates a terminal device to perform cell measurement to obtain N cells meeting a cell quality parameter threshold, and N is an integer greater than 1.

Operation 302: The network device sends the indication information to the terminal device.

Operation 303: The terminal device performs cell measurement based on the indication information.

The network device may send the indication information to the terminal device by using signaling RRCReconfiguration.

In one embodiment, the indication information may have different forms in different scenarios, for example, may be represented as the following four examples:

Example a1: The indication information may directly include N and the cell quality parameter threshold that needs to be met, so that the terminal device performs cell measurement to obtain the N cells meeting the cell quality parameter threshold. It should be noted that meeting the cell quality parameter threshold mentioned in this embodiment of this application may be understood as being not less than the cell quality parameter threshold, greater than the cell quality parameter threshold, or any other limitation that meets the condition. This is not specifically limited in this application. In this scenario, cell quality parameters may be a reference signal received power (RSRP) of a cell, a signal to interference plus noise ratio (signal to SINR) of the cell, and the like.

Example a2: The indication information may include only N, and whether the cell quality parameter threshold is met may be determined based on whether the cell triggers an event, for example, may be a triggering event of whether a triggering quantity of cells is greater than a threshold. However, in this case, the terminal device is configured as an event-triggered type. For example, for event-triggered (event-Triggered), "meeting the cell quality parameter threshold" may be determined based on whether the cell meets an entering condition. In other words, when one cell triggers the event, the cell meets the quality parameter threshold. For another example, "not meeting the cell quality parameter threshold" may be determined based on whether the cell meets a leaving condition. In other words, when one cell meets the leaving condition, the cell is removed from a cells triggered list (cellsTriggeredList), and the terminal device considers that the cell no longer belongs to cells meeting the cell quality parameter threshold, so that the cells meeting the cell quality parameter threshold may be obtained by using the foregoing method.

Example a3: The indication information indicates that N is a maximum quantity of reported neighboring cells (maxReportCells), and in this case, N reuses the maxReportCells. In this scenario, the indication information may include one mode indication, and the mode indication may be a power saving mode indication. In other words, when the indication information includes the mode indication, the terminal device may automatically identify that the quantity of to-be-measured cells needs to be determined based on the maxReportCells. In addition, for a specific situation in which the cell quality parameter threshold is met in this scenario, refer to the foregoing example a1 or example a2. Details are not described herein again.

Example a4: The indication information indicates that N is a fixed value specified in a protocol, for example, N may be different fixed values such as 3 and 4. Values of N may be different based on different actual situations. For example, it is specified in the standard protocol 38.133 v15.4.0 that for each intra-frequency/inter-frequency frequency, the terminal device is required to monitor at least four cells. In this case, N may be 4, or N may be 3 (serving cells obtained by 4 minus 1) for an intra-frequency frequency and 4 for an inter-frequency frequency. It should be noted that the foregoing is merely an example, and is not a limitation on N. It should be understood that N may alternatively be other fixed values than 3 or 4 specified in the protocol. This is not specifically limited in this application. In this scenario, the indication information may also include one mode indication, and the mode indication is a power saving mode indication. For details, refer to example a3. In addition, for a specific situation in which the cell quality parameter threshold is met, refer to the foregoing example a1 or example a2. Details are not described herein again.

In one embodiment, after receiving the indication information, the terminal device performs cell measurement to obtain N cells meeting a cell quality parameter threshold, where N is an integer greater than 1, then performs cell measurement on the obtained N cells, and reports a measurement result. A specific process may be as follows: The terminal device may perform cell measurement to select initial N cells meeting the cell quality parameter threshold, and then periodically or aperiodically monitor and measure the obtained N cells in a specific manner. When there are cells that do not meet the cell quality parameter threshold in the N cells, a corresponding quantity of cells that do not meet the cell quality parameter threshold is added, so that the N cells meeting the cell quality parameter threshold can always be obtained.

In one embodiment, that the terminal device performs cell measurement to select initial N cells meeting a cell quality parameter threshold may include the following two specific methods:

Method b1: The terminal device measures all neighboring cells on a frequency of a current SSB, and selects N neighboring cells with best cell quality parameter thresholds, to obtain the N cells meeting the cell quality parameter threshold.

Method b2: The terminal device measures neighboring cells on a frequency of a current SSB, and stops measurement after detecting N neighboring cells whose cell quality parameter thresholds are not less than the cell quality parameter threshold, to obtain the N cells meeting the cell quality parameter threshold.

After the terminal device obtains the N initial cells by using the foregoing method, the terminal device monitors the N cells to perform periodic or aperiodic measurement. When M (M is an integer greater than 1) cells in the N cells do not meet the cell quality parameter threshold, the quantity of cells are added by the terminal device by using the following two methods:

Method c1: The terminal device measures cells other than the N cells, to obtain M cells meeting the cell quality parameter threshold. In this way, the N cells meeting the cell quality parameter threshold can be obtained.

Method c2: The terminal device measures all neighboring cells on a frequency of a current SSB, to obtain N cells with best cell quality parameters and meeting the cell quality parameter threshold. In this method, provided that there is a cell that does not meet the cell quality parameter threshold in the N cells, all neighboring cells are re-measured to obtain the N cells meeting the cell quality parameter threshold.

It should be noted that, in the foregoing method c1, when the terminal device measures the cells other than the N cells, if there are still no M cells meeting the cell quality parameter threshold, the terminal device uses the foregoing method c2.

In one embodiment, if there is a cell that does not meet the cell quality parameter threshold in the N cells, the terminal device first does not measure other neighboring cells. Until there is no neighboring cell meeting the condition in the N cells, or after the terminal device receives indication information from the network device that indicates the terminal device to measure all neighboring cells once, or when a set measurement timer expires, the terminal device measures other neighboring cells to further obtain the N cells meeting the cell quality parameter threshold.

The indication information in this embodiment of this application may occupy one bit. Certainly, the indication information may alternatively be in other forms. This is not specifically limited herein.

In this embodiment, before the network device determines and delivers the indication information to the terminal device, the network device may receive capability information that is reported by the terminal device and that may support a power saving mode, or receive a power saving mode request of the terminal device.

In this embodiment, N indicated by the indication information may be used for only a frequency of one SSB. In this case, N may exist in reportConfig or MO. N may alternatively be shared by a plurality of frequencies. In this case, N exists in measConfig. Similarly, in this embodiment, when the indication information includes the cell quality parameter threshold, the cell quality parameter threshold may be used for only a frequency of one SSB, and exist in reportConfig or MO; or may be shared by a plurality of frequencies, and the cell quality parameter threshold exists in measConfig.

In this embodiment, when monitoring the N cells, the terminal device may determine, by using access control, a cell that does not meet the condition. Specifically, the terminal device may read system messages of the N cells. If one cell is barred (bar) from access, it indicates that the cell does not meet the condition, and the cell is no longer monitored (or the cell is no longer monitored within a specific period of time (controlled by a timer)).

It should be noted that a situation in which the terminal device is in a connected state is described above. When the terminal device is in an idle state/inactive state, the terminal device performs cell reselection and also needs to perform cell measurement on the neighboring cell. In this case, the network device may broadcast indication information to the terminal device by using a broadcast message. For specific description of the broadcast indication information, refer to the indication information described above; and for the operation performed by the terminal device based on the indication information, refer to the behavior of the terminal device described above. Details are not described herein again.

In an example, the network device may add the indication information to an RRCRelease message when the terminal device enters an idle/inactive state from a connected state.

According to the cell measurement method provided in this embodiment of this application, after receiving the indication information from the network device, the terminal device performs cell measurement based on the indication information, where the indication information indicates the terminal device to perform cell measurement to obtain the N cells meeting the cell quality parameter threshold. In this way, the terminal device does not need to measure all the cells in real time, and may measure only the N cells in a targeted manner, to reduce a quantity of to-be-measured cells, thereby reducing power of the terminal device to avoid a resource waste.

Figure 4:
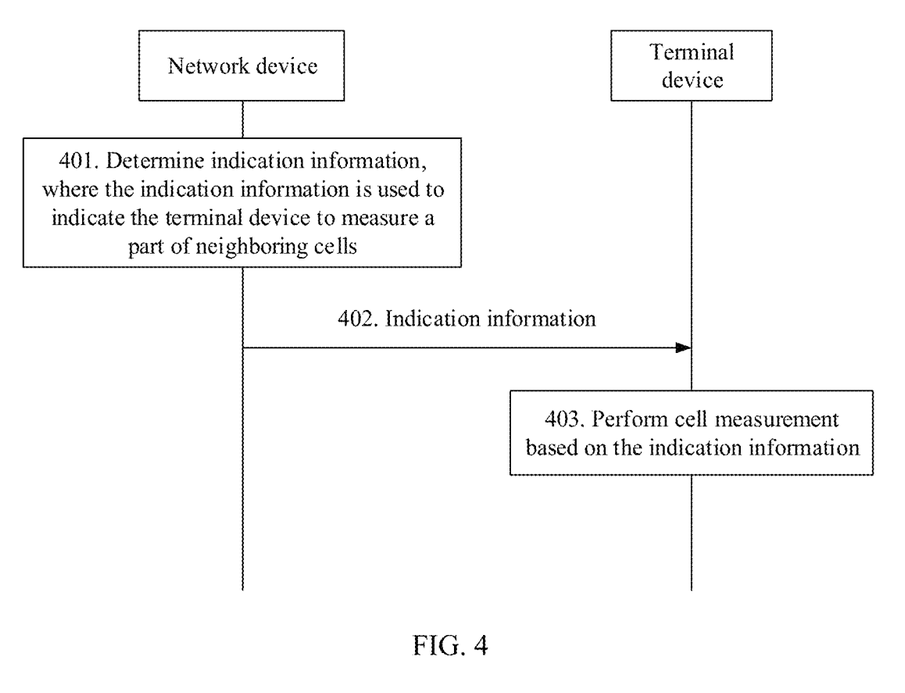
FIG. 4 is a flowchart of another cell measurement method according to this application.

An embodiment of this application further provides a cell measurement method applicable to the communications system shown in FIG. 2. Referring to FIG. 4, a specific procedure of the method may include the following operations:

Operation 401: A network device determines indication information, where the indication information is used to indicate a terminal device to measure a part of neighboring cells.

Operation 402: The network device sends the indication information to the terminal device.

Operation 403: The terminal device performs cell measurement based on the indication information.

The network device may send the indication information to the terminal device by using signaling RRCReconfiguration.

In one embodiment, the indication information may be represented as, but not limited to, the following three forms:

Example d1: The indication information includes PCI information, and the PCI information indicates a part of PCIs in an available PCI set. The available PCI set may include a value set of PCIs from 0 to 1007, or the available PCI set may include a PCI specified by the network device, or the available PCI set may include another value set of PCIs specified in a protocol. The available PCI set is not specifically limited in this application.

Example d2: The indication information includes the PCI information and a first measurement indication, and the first measurement indication is used to indicate the terminal device to perform cell measurement based on a PCI corresponding to the PCI information.

Example d3: The indication information includes a second measurement indication, and the second measurement indication is used to indicate the terminal device to measure a neighboring cell indicated in a measurement object MO.

In an example implementation, the PCI information in the foregoing example d1 and example d2 may be classified into the following four cases:

Case e1: The PCI information may be a PCI list. In other words, the PCI information explicitly includes specific PCIs. For example, the PCI list may include some values from 0 to 1007 or others. In this way, the terminal device may perform cell measurement directly based on the PCIs in the PCI list.

Case e2: The PCI information may include a start PCI and an end PCI. In this case, the terminal device may determine, based on the start PCI and the end PCI, PCIs used for measurement. For example, if the start PCI is 100, and the end PCI is 800, the terminal device may determine that the PCIs used for measurement are values from 100 to 800.

Case e3: The PCI information includes a start PCI and a quantity of PCIs. For example, when the start PCI is 50, and the quantity of PCIs is 50, the terminal device may determine that the PCIs used for measurement are values from 50 to 99.

Case e4: The PCI information includes an end PCI and a quantity of PCIs. For example, if the quantity of PCIs is 100, and the end PCI is 100, the terminal device may determine that the PCIs used for measurement are values from 1 to 100.

In one embodiment, when the indication information is the indication information shown in the foregoing example d3, that the terminal device performs cell measurement based on the indication information may be specifically: The terminal device removes a neighboring cell corresponding to a PCI indicated by a cell removal list in the MO from a list of to-be-measured neighboring cells that is stored in the terminal device, and adds, to the list of to-be-measured neighboring cells that is stored in the terminal device, a neighboring cell corresponding to a PCI indicated by a cell addition or modification list in the MO; and the terminal device performs cell measurement based on the list of to-be-measured neighboring cells that is stored in the terminal device. In an example, the MO may obtain the list of to-be-measured neighboring cells that is stored in the terminal device by using a cells to remove list (cellsToRemoveList) and a cells to add or modify list (cellsToAddModList). The terminal device removes the neighboring cell corresponding to the PCI indicated in the cellsToRemoveList from the list of to-be-measured neighboring cells that is stored in the terminal device, and the terminal device adds, to the list of to-be-measured neighboring cells that is stored in the terminal device, the neighboring cell corresponding to the PCI indicated in the cellsToAddModList. In another example, the MO may obtain, by using a white cells to remove list (whiteCellsToRemoveList) and a white cells to add or modify list whiteCellsToAddModList, the list of to-be-measured neighboring cells that is stored in the terminal device. The terminal device removes the neighboring cell corresponding to the PCI indicated in the whiteCellsToRemoveList from the list of to-be-measured neighboring cells that is stored in the terminal device, and the terminal device adds, to the list of to-be-measured neighboring cells that is stored in the terminal device, the neighboring cell corresponding to the PCI indicated in the whiteCellsToAddModList.

In one embodiment, the PCI corresponding to the PCI information may reuse the PCI indicated in the MO. In this case, the indication information may include only one mode indication, and the mode indication may be a power saving mode indication. For a specific measurement process in which the terminal device performs cell measurement based on the PCI indicated in the MO, refer to the cell measurement method performed by the terminal device in the foregoing example d3. Details are not described herein again.

It should be noted that both the first measurement indication and the second measurement indication may be a power saving mode indication. This is not limited in this application.

It should be noted that a situation in which the terminal device is in a connected state is described above. When the terminal device is in an idle state/inactive state, the terminal device performs cell reselection and also needs to perform cell measurement on the neighboring cell. In this case, the network device may broadcast indication information to the terminal device by using a broadcast message. Specifically, In one embodiment, for the indication information broadcast by the network device, refer to the foregoing example d1 and example d2. Details are not described herein again. In another embodiment, the indication information broadcast by the network device may include a third measurement indication (where the third measurement indication may also be a power saving mode indication) and a white cells list. The white list is represented by using the PCI information (refer to the foregoing case e1 to case e4), and when the indication information includes the white cells list, the terminal device measures only a cell in the white cells list. In still another possible implementation, the indication information broadcast by the network device includes only the white cells list, and the terminal device may learn to measure only a cell in the white cells list. The white cells list is used for each frequency. In other words, when the message broadcast by the network device indicates a plurality of frequencies, there may be one white cells list in each frequency. In still another possible implementation, the indication information broadcast by the network device may include a fourth measurement indication, and the fourth measurement indication is used to indicate to measure a neighboring cell indicated in a specific neighboring cell list. The method in this implementation is similar to the method indicated by the indication information in the foregoing example d3. For example, the specific neighboring cell list may be an intra-frequency neighboring cell list (IntraFreqNeighCellInfoList) in system information 3 (SIB 3), or may be an inter-frequency neighboring cell list (InterFreqNeighCellList) in a SIB 4. Then the terminal device performs cell measurement on a neighboring cell in the specific neighboring cell list. In this implementation, the fourth measurement indication may alternatively be a power saving mode indication.

According to the cell measurement method provided in this embodiment of this application, after receiving the indication information from the network device, the terminal device performs cell measurement on the part of neighboring cells based on the indication information. In this way, the terminal device does not need to measure all the cells in real time, and may measure only the N cells in a targeted manner, to reduce a quantity of to-be-measured cells, thereby reducing power of the terminal device to avoid a resource waste.

Based on the foregoing embodiments, an embodiment of this application further provides a terminal device. The terminal device is applied to the communications system shown in FIG. 2. The terminal device may include a transceiver unit 501 and a processing unit 502. For details, refer to a schematic structural diagram shown in FIG. 5.

Figure 5:
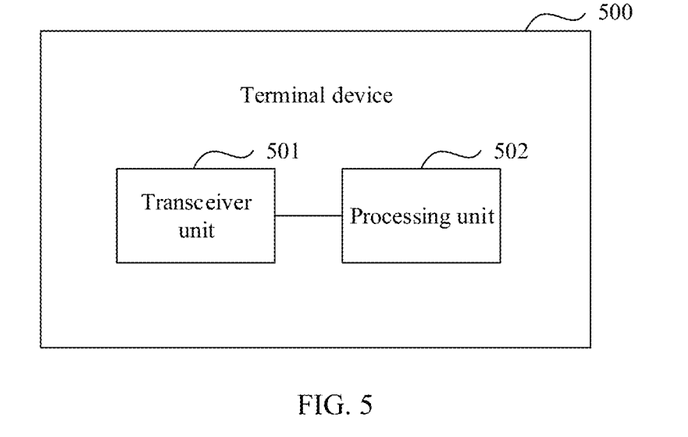
FIG. 5 is a schematic structural diagram of a terminal device according to this application.

In an embodiment, the terminal device shown in FIG. 5 may be configured to perform operations of the terminal device in the embodiment shown in FIG. 3. For example:

The transceiver unit 501 is configured to receive indication information from a network device, where the indication information indicates the terminal device to perform cell measurement to obtain N cells meeting a cell quality parameter threshold, and N is an integer greater than or equal to 1. The processing unit 502 is configured to perform cell measurement based on the indication information.

In one embodiment, when M cells in the N cells do not meet the cell quality parameter threshold, the processing unit 502 is further configured to measure cells other than the N cells, to obtain M cells meeting the cell quality parameter threshold, where M is an integer greater than or equal to 1.

In one embodiment, when M cells in the N cells do not meet the cell quality parameter threshold, the processing unit 502 is further configured to measure all neighboring cells on a frequency of a current synchronization signal/physical broadcast channel block SSB, to obtain N cells with best cell quality parameters and meeting the cell quality parameter threshold, where M is an integer greater than or equal to 1.

In one embodiment, the indication information indicates that N is a maximum quantity of reported neighboring cells maxReportCells.

After the terminal device provided in this embodiment of this application receives the indication information from the network device, the terminal device performs cell measurement based on the indication information, where the indication information indicates the terminal device to perform cell measurement to obtain the N cells meeting the cell quality parameter threshold. In this way, the terminal device does not need to measure all the cells in real time, and may measure only the N cells in a targeted manner, to reduce a quantity of to-be-measured cells, thereby reducing power of the terminal device to avoid a resource waste.

In another embodiment, the terminal device shown in FIG. 5 may be configured to perform operations of the terminal device in the embodiment shown in FIG. 4. For example:

The transceiver unit 501 is configured to receive indication information from a network device, where the indication information is used to indicate the terminal device to measure a part of neighboring cells. The processing unit 502 is configured to perform cell measurement based on the indication information.

In one embodiment, the indication information includes physical cell identifier PCI information, and the PCI information indicates a part of PCIs in an available PCI set.

In one embodiment, the indication information further includes a first measurement indication, and the first measurement indication is used to indicate the terminal device to perform cell measurement based on a PCI corresponding to the PCI information.

In one embodiment, the PCI information is a PCI list; the PCI information includes a start PCI and an end PCI; the PCI information includes a start PCI and a quantity of PCIs; or the PCI information includes an end PCI and a quantity of PCIs.

In one embodiment, the indication information includes a second measurement indication, and the second measurement indication is used to indicate the terminal device to measure a neighboring cell indicated in a measurement object MO.

In one embodiment, when performing cell measurement based on the indication information, the processing unit 502 is specifically configured to: remove a neighboring cell corresponding to a PCI indicated by a cell removal list in the MO from a list of to-be-measured neighboring cells that is stored in the terminal device; and add, to the list of to-be-measured neighboring cells that is stored in the terminal device, a neighboring cell corresponding to a PCI indicated by a cell addition or modification list in the MO; and perform cell measurement based on the list of to-be-measured neighboring cells that is stored in the terminal device.

After receiving the indication information from the network device, the terminal device provided in this embodiment of this application performs cell measurement on the part of neighboring cells based on the indication information. In this way, the terminal device does not need to measure all the cells in real time, and may measure only the N cells in a targeted manner, to reduce a quantity of to-be-measured cells, thereby reducing power of the terminal device to avoid a resource waste.

Based on the foregoing embodiments, an embodiment of this application further provides a network device. The network device is applied to the communications system shown in FIG. 2. The network device may include a processing unit 601 and a transceiver unit 602. For details, refer to a schematic structural diagram shown in FIG. 6.

Figure 6:
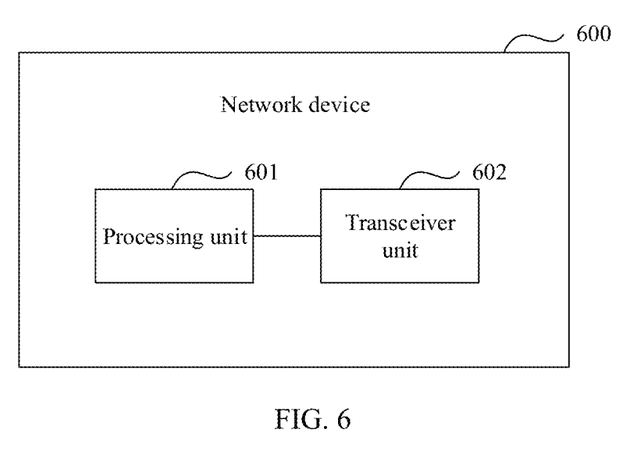
FIG. 6 is a schematic structural diagram of a network device according to this application.

In an embodiment, the network device shown in FIG. 6 may be configured to perform operations of the network device in the embodiment shown in FIG. 3. For example:

The processing unit 601 is configured to determine indication information, where the indication information indicates a terminal device to perform cell measurement to obtain N cells meeting a cell quality parameter threshold, and N is an integer greater than or equal to 1. The transceiver unit 602 is configured to send the indication information to the terminal device.

In one embodiment, the indication information indicates that N is a maximum quantity of reported neighboring cells maxReportCells.

After the network device provided in this embodiment of this application sends the indication information to the terminal device, the terminal device performs cell measurement based on the indication information, where the indication information indicates the terminal device to perform cell measurement to obtain the N cells meeting the cell quality parameter threshold. In this way, the terminal device does not need to measure all the cells in real time, and may measure only the N cells in a targeted manner, to reduce a quantity of to-be-measured cells, thereby reducing power of the terminal device to avoid a resource waste.

In another embodiment, the network device shown in FIG. 6 may be configured to perform operations of the network device in the embodiment shown in FIG. 4. For example:

The processing unit 601 is configured to determine indication information, where the indication information is used to indicate the terminal device to measure a part of neighboring cells. The transceiver unit 602 is configured to send the indication information to the terminal device.

In one embodiment, the indication information includes physical cell identifier PCI information, and the PCI information indicates a part of PCIs in an available PCI set.

In one embodiment, the indication information further includes a first measurement indication, and the first measurement indication is used to indicate the terminal device to perform cell measurement based on a PCI corresponding to the PCI information.

In one embodiment, the PCI information is a PCI list; the PCI information includes a start PCI and an end PCI; the PCI information includes a start PCI and a quantity of PCIs; or the PCI information includes an end PCI and a quantity of PCIs.

In one embodiment, the indication information includes a second measurement indication, and the second measurement indication is used to indicate the terminal device to measure a neighboring cell indicated in a measurement object (MO).

After the network device provided in this embodiment of this application sends the indication information to the terminal device, the terminal device performs cell measurement on the part of neighboring cells based on the indication information. In this way, the terminal device does not need to measure all the cells in real time, and may measure only the N cells in a targeted manner, to reduce a quantity of to-be-measured cells, thereby reducing power of the terminal device to avoid a resource waste.

It should be noted that, in this embodiment of this application, division into units is an example, and is merely a logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Based on the foregoing embodiments, an embodiment of this application further provides a terminal device. The terminal device is applied to the communications system shown in FIG. 1. The terminal device may include a transceiver 701 and a processor 702, and In one embodiment may further include a memory 703. For details, refer to a structural diagram shown in FIG. 7.

Figure 7:
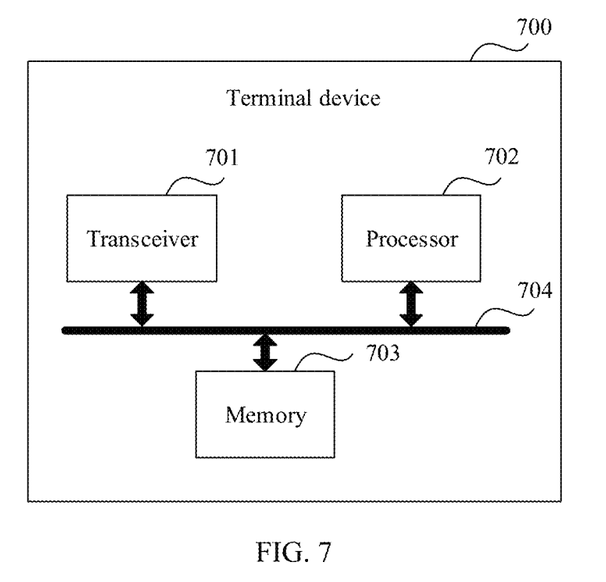
FIG. 7 is a structural diagram of a terminal device according to this application.

The processor 702 may be a central processing unit (CPU), a network processor (NP), a combination of a CPU and an NP, or the like. The processor 702 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. When implementing the foregoing functions, the processor 702 may be implemented by hardware, or certainly may be implemented by hardware executing corresponding software.

The transceiver 701 and the processor 702 are connected to each other. In one embodiment, the transceiver 701 and the processor 702 are connected to each other by using a bus 704. The bus 704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

In an embodiment, the terminal device shown in FIG. 7 may be configured to perform operations of the terminal device in the embodiment shown in FIG. 3. For example:

The transceiver 701 is configured to receive indication information from a network device, where the indication information indicates the terminal device to perform cell measurement to obtain N cells meeting a cell quality parameter threshold, and N is an integer greater than or equal to 1. The processor 702 is configured to perform cell measurement based on the indication information.

In one embodiment, when M cells in the N cells do not meet the cell quality parameter threshold, the processor 702 is further configured to measure cells other than the N cells, to obtain M cells meeting the cell quality parameter threshold, where M is an integer greater than or equal to 1.

In one embodiment, when M cells in the N cells do not meet the cell quality parameter threshold, the processor 702 is further configured to measure all neighboring cells on a frequency of a current synchronization signal/physical broadcast channel block SSB, to obtain N cells with best cell quality parameters and meeting the cell quality parameter threshold, where M is an integer greater than or equal to 1.

In one embodiment, the indication information indicates that N is a maximum quantity of reported neighboring cells maxReportCells.

In one embodiment, the memory 703 is coupled to the processor 702, and is configured to store a program, and the like. Specifically, the program may include program code, and the program code includes computer operation instructions. The memory 703 may include a RAM, or may be a non-volatile memory, for example, at least one magnetic disk memory. The processor 702 executes the application program stored in the memory 703, to implement the foregoing functions, thereby implementing the cell measurement method shown in FIG. 3.

After receiving the indication information from the network device, the terminal device provided in this embodiment of this application performs cell measurement based on the indication information, where the indication information indicates the terminal device to perform cell measurement to obtain the N cells meeting the cell quality parameter threshold. In this way, the terminal device does not need to measure all the cells in real time, and may measure only the N cells in a targeted manner, to reduce a quantity of to-be-measured cells, thereby reducing power of the terminal device to avoid a resource waste.

In another embodiment, the terminal device shown in FIG. 7 may be configured to perform operations of the terminal device in the embodiment shown in FIG. 4. For example:

The transceiver 701 is configured to receive indication information from a network device, where the indication information is used to indicate the terminal device to measure a part of neighboring cells. The processor 702 is configured to perform cell measurement based on the indication information.

In one embodiment, the indication information includes physical cell identifier PCI information, and the PCI information indicates a part of PCIs in an available PCI set.

In one embodiment, the indication information further includes a first measurement indication, and the first measurement indication is used to indicate the terminal device to perform cell measurement based on a PCI corresponding to the PCI information.

In one embodiment, the PCI information is a PCI list; the PCI information includes a start PCI and an end PCI; the PCI information includes a start PCI and a quantity of PCIs; or the PCI information includes an end PCI and a quantity of PCIs.

In one embodiment, the indication information includes a second measurement indication, and the second measurement indication is used to indicate the terminal device to measure a neighboring cell indicated in a measurement object MO.

In one embodiment, when performing cell measurement based on the indication information, the processor 702 is specifically configured to: remove a neighboring cell corresponding to a PCI indicated by a cell removal list in the MO from a list of to-be-measured neighboring cells that is stored in the terminal device; and add, to the list of to-be-measured neighboring cells that is stored in the terminal device, a neighboring cell corresponding to a PCI indicated by a cell addition or modification list in the MO; and perform cell measurement based on the list of to-be-measured neighboring cells that is stored in the terminal device.

In one embodiment, the memory 703 is coupled to the processor 702, and is configured to store a program, and the like. Specifically, the program may include program code, and the program code includes computer operation instructions. The memory 703 may include a RAM, or may be a non-volatile memory, for example, at least one magnetic disk memory. The processor 702 executes the application program stored in the memory 703, to implement the foregoing functions, thereby implementing the cell measurement method shown in FIG. 4.

After receiving the indication information from the network device, the terminal device provided in this embodiment of this application performs cell measurement on the part of neighboring cells based on the indication information. In this way, the terminal device does not need to measure all the cells in real time, and may measure only the N cells in a targeted manner, to reduce a quantity of to-be-measured cells, thereby reducing power of the terminal device to avoid a resource waste.

Based on the foregoing embodiments, an embodiment of this application further provides a network device. The network device is applied to the communications system shown in FIG. 1. The network device may include a transceiver 801 and a processor 802, and In one embodiment may further include a memory 803. For details, refer to a structural diagram shown in FIG. 8.

Figure 8:
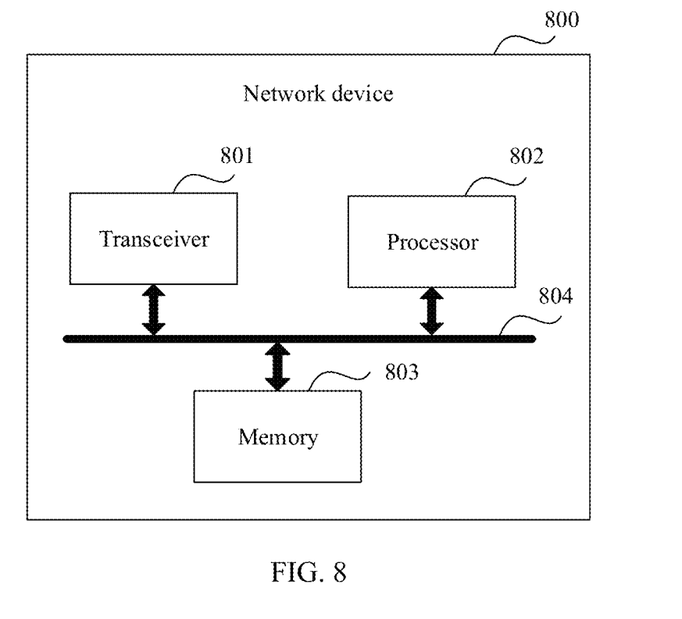
FIG. 8 is a structural diagram of a network device according to this application.

The processor 802 may be a central processing unit (CPU), a network processor (NP), a combination of a CPU and an NP, or the like. The processor 802 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. When implementing the foregoing functions, the processor 802 may be implemented by hardware, or certainly may be implemented by hardware executing corresponding software.

The transceiver 801 and the processor 802 are connected to each other. In one embodiment, the transceiver 801 and the processor 802 are connected to each other by using a bus 804. The bus 804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

In an embodiment, the network device shown in FIG. 8 may be configured to perform operations of the network device in the embodiment shown in FIG. 3. For example:

The processor 802 is configured to determine indication information, where the indication information indicates a terminal device to perform cell measurement to obtain N cells meeting a cell quality parameter threshold, and N is an integer greater than or equal to 1. The transceiver 801 is configured to send the indication information to the terminal device.

In one embodiment, the indication information indicates that N is a maximum quantity of reported neighboring cells maxReportCells.

In one embodiment, the memory 803 is coupled to the processor 802, and is configured to store a program, and the like. Specifically, the program may include program code, and the program code includes computer operation instructions. The memory 803 may include a RAM, or may be a non-volatile memory, for example, at least one magnetic disk memory. The processor 802 executes the application program stored in the memory 803, to implement the foregoing functions, thereby implementing the cell measurement method shown in FIG. 3.

After the network device provided in this embodiment of this application sends the indication information to the terminal device, the terminal device performs cell measurement based on the indication information, where the indication information indicates the terminal device to perform cell measurement to obtain the N cells meeting the cell quality parameter threshold. In this way, the terminal device does not need to measure all the cells in real time, and may measure only the N cells in a targeted manner, to reduce a quantity of to-be-measured cells, thereby reducing power of the terminal device to avoid a resource waste.

In another embodiment, the network device shown in FIG. 8 may be configured to perform operations of the network device in the embodiment shown in FIG. 4. For example:

The processor 802 is configured to determine indication information, where the indication information is used to indicate the terminal device to measure a part of neighboring cells. The transceiver 801 is configured to send the indication information to the terminal device.

In one embodiment, the indication information includes physical cell identifier PCI information, and the PCI information indicates a part of PCIs in an available PCI set.

In one embodiment, the indication information further includes a first measurement indication, and the first measurement indication is used to indicate the terminal device to perform cell measurement based on a PCI corresponding to the PCI information.

In one embodiment, the PCI information is a PCI list; the PCI information includes a start PCI and an end PCI; the PCI information includes a start PCI and a quantity of PCIs; or the PCI information includes an end PCI and a quantity of PCIs.

In one embodiment, the indication information includes a second measurement indication, and the second measurement indication is used to indicate the terminal device to measure a neighboring cell indicated in a measurement object MO.

In one embodiment, the memory 803 is coupled to the processor 802, and is configured to store a program, and the like. Specifically, the program may include program code, and the program code includes computer operation instructions. The memory 803 may include a RAM, or may be a non-volatile memory, for example, at least one magnetic disk memory. The processor 802 executes the application program stored in the memory 803, to implement the foregoing functions, thereby implementing the cell measurement method shown in FIG. 4.

After the network device provided in this embodiment of this application sends the indication information to the terminal device, the terminal device performs cell measurement on the part of neighboring cells based on the indication information. In this way, the terminal device does not need to measure all the cells in real time, and may measure only the N cells in a targeted manner, to reduce a quantity of to-be-measured cells, thereby reducing power of the terminal device to avoid a resource waste.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A cell measurement method, comprising:
   receiving, by a terminal device, indication information from a network device, wherein the indication information indicates the terminal device to perform a cell measurement to obtain N cells that meet a cell quality parameter threshold based on whether each cell of the N cells meets an entering condition and triggers an event, and wherein N is an integer greater than or equal to 1 and less than a total number of cells; and
   performing, by the terminal device, the cell measurement on the N cells based on the indication information, comprising:
      performing the cell measurement to select initial N cells meeting the cell quality parameter threshold including:
         performing the cell measurement on neighboring cells on a frequency of a current synchronization signal/physical broadcast channel block (SSB), and
         stopping the cell measurement after detecting N neighboring cells of which cell quality parameter thresholds are not less than the cell quality parameter threshold, to obtain the N cells meeting the cell quality parameter threshold.

2. The method according to claim 1, further comprising:
   when M cells in the initial N cells do not meet the cell quality parameter threshold, measuring, by the terminal device, cells other than the initial N cells to obtain another M cells meeting the cell quality parameter threshold, wherein M is an integer greater than or equal to 1.

3. The method according to claim 1, further comprising:
   when M cells in the initial N cells do not meet the cell quality parameter threshold, measuring, by the terminal device, all neighboring cells on a frequency of the current SSB, to obtain another N cells with best cell quality parameters and meeting the cell quality parameter threshold, wherein M is an integer greater than or equal to 1.

4. The method according to claim 1, wherein the indication information indicates that N is a maximum quantity of reported neighboring cells.

5. A terminal device, comprising:
a transceiver, configured to receive indication information from a network device, wherein the indication information indicates the terminal device to perform a cell measurement to obtain N cells that meet a cell quality parameter threshold based on whether each cell of the N cells meets an entering condition and triggers an event, and N is an integer greater than or equal to 1 and less than a total number of cells; and
a processor, configured to perform the cell measurement on the N cells based on the indication information, wherein the processor is configured to:
  perform the cell measurement to select initial N cells meeting the cell quality parameter threshold, wherein the processor is configured to:
    perform the cell measurement on neighboring cells on a frequency of a current synchronization signal/physical broadcast channel block (SSB), and
    stop the cell measurement after detecting N neighboring cells of which cell quality parameter thresholds are not less than the cell quality parameter threshold, to obtain the N cells meeting the cell quality parameter threshold.

6. The terminal device according to claim 5, wherein the processor is further configured to:
when M cells in the initial N cells do not meet the cell quality parameter threshold, measure cells other than the initial N cells to obtain another M cells meeting the cell quality parameter threshold, wherein M is an integer greater than or equal to 1.

7. The terminal device according to claim 5, wherein the processor is further configured to:
when M cells in the initial N cells do not meet the cell quality parameter threshold, measure all neighboring cells on a frequency of the current SSB, to obtain another N cells with best cell quality parameters and meeting the cell quality parameter threshold, wherein M is an integer greater than or equal to 1.

8. The terminal device according to claim 5, wherein the indication information indicates that N is a maximum quantity of reported neighboring cells.

9. A network device, comprising:
a processor, configured to determine indication information, wherein the indication information indicates a terminal device to perform a cell measurement to obtain N cells that meet a cell quality parameter threshold based on whether each cell of the N cells meets an entering condition and triggers an event, and N is an integer greater than or equal to 1 and less than a total number of cells; and
a transceiver, configured to send the indication information to the terminal device such that the terminal device performs the cell measurement on the N cells based on the indication information, wherein the terminal device is configured to perform the cell measurement to select initial N cells meeting the cell quality parameter threshold, wherein the terminal device is configured to perform the cell measurement on neighboring cells on a frequency of a current synchronization signal/physical broadcast channel block (SSB), and stop the cell measurement after detecting N neighboring cells of which cell quality parameter thresholds are not less than the cell quality parameter threshold, to obtain the N cells meeting the cell quality parameter threshold.

10. The network device according to claim 9, wherein the indication information indicates that N is a maximum quantity of reported neighboring cells.

* * * * *